(12) United States Patent
Herbst

(10) Patent No.: US 6,261,502 B1
(45) Date of Patent: Jul. 17, 2001

(54) METHOD FOR INJECTION MOLDING A PLASTIC MATERIAL COMPOSITE DEVICE

(76) Inventor: Richard Herbst, Freisinger Strasse 3b, D-85386 Eching (DE)

( * ) Notice: Subject to any disclaimer, the term of this patent is extended or adjusted under 35 U.S.C. 154(b) by 0 days.

(21) Appl. No.: 09/188,418

(22) Filed: Nov. 9, 1998

(30) Foreign Application Priority Data

Nov. 7, 1997 (DE) .............................. 197 49 243

(51) Int. Cl.$^7$ ............................ B29C 45/14; B29C 70/70
(52) U.S. Cl. .............. 264/275; 264/272.15; 264/272.17; 264/276; 264/294
(58) Field of Search ................................... 264/230, 255, 264/265, 271.1, 272.11, 272.15, 272.17, 275, 294, 323, 249, 276; 29/446, 450, 451

(56) References Cited

U.S. PATENT DOCUMENTS

| | | | |
|---|---|---|---|
| 3,959,061 | * | 5/1976 | Renck et al. ..................... 156/262 |
| 4,203,191 | * | 5/1980 | Gibson, Sr. ......................... 29/451 |
| 4,610,834 | * | 9/1986 | Baron et al. ......................... 29/451 |
| 4,737,620 | | 4/1988 | Mollet et al. . |
| 4,947,531 | * | 8/1990 | Brisson .............................. 29/446 |
| 5,319,841 | * | 6/1994 | Yata et al. ........................... 29/450 |
| 5,510,074 | | 4/1996 | Rose . |
| 5,800,763 | * | 9/1998 | Hoppe et al. ..................... 264/255 |
| 5,935,497 | * | 8/1999 | Rose ................................... 264/275 |

FOREIGN PATENT DOCUMENTS

| | | |
|---|---|---|
| 41 15 208 C 2 | 11/1992 | (DE) . |
| 41 42 392 A 1 | 7/1993 | (DE) . |
| 41 42 410 A 1 | 7/1993 | (DE) . |
| 2-251 496 | 10/1990 | (JP) . |

* cited by examiner

*Primary Examiner*—Angela Ortiz
(74) *Attorney, Agent, or Firm*—Knobbe, Martens, Olson & Bear, LLP

(57) ABSTRACT

A method and an apparatus are used for injection molding composite devices comprised of a plastic material and a component being at least partially embedded in the plastic material. A mold is provided having a cavity therein. The cavity has a surface and an access bore is provided in the mold which ends in the cavity surface via an opening. The component is fed through the access bore and via the opening to the cavity. The component is configured to positively cover with overlap the opening upon transition thereof while coming to rest on the surface. Molten plastic material is injected into the cavity to enclose the component, thus forming the composite device. After solidifying of the plastic material the composite device is ejected from the cavity.

9 Claims, 3 Drawing Sheets

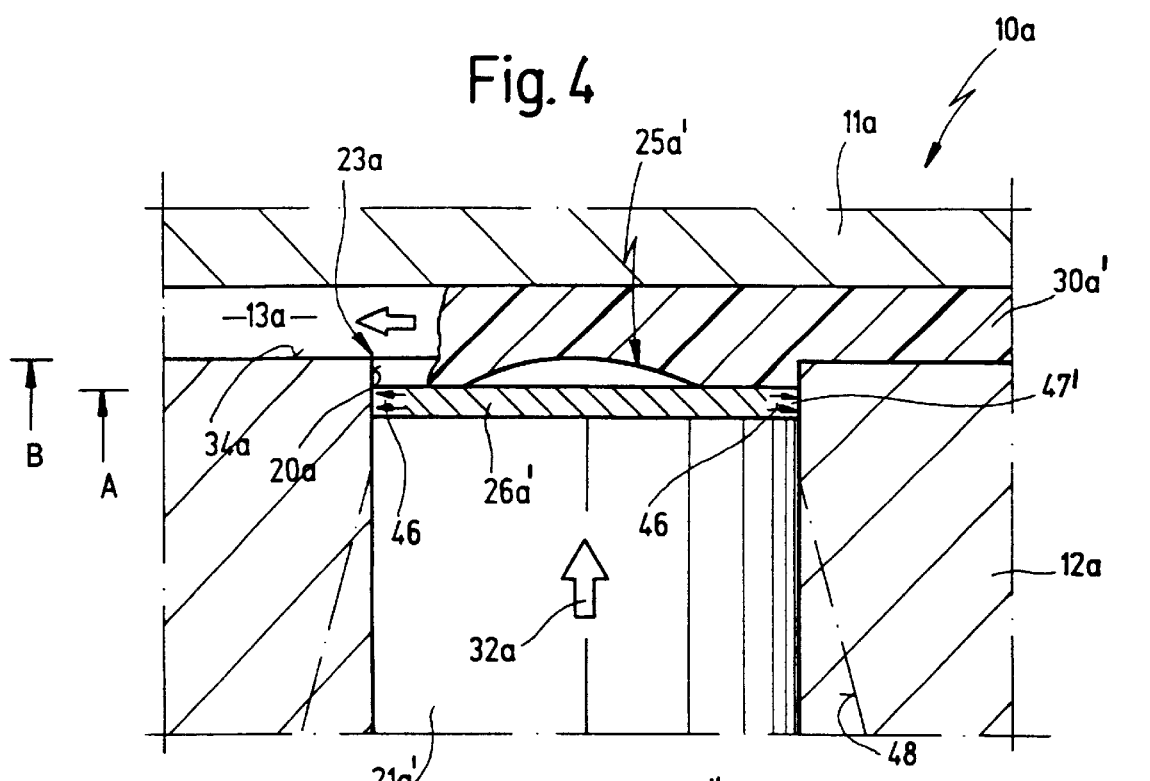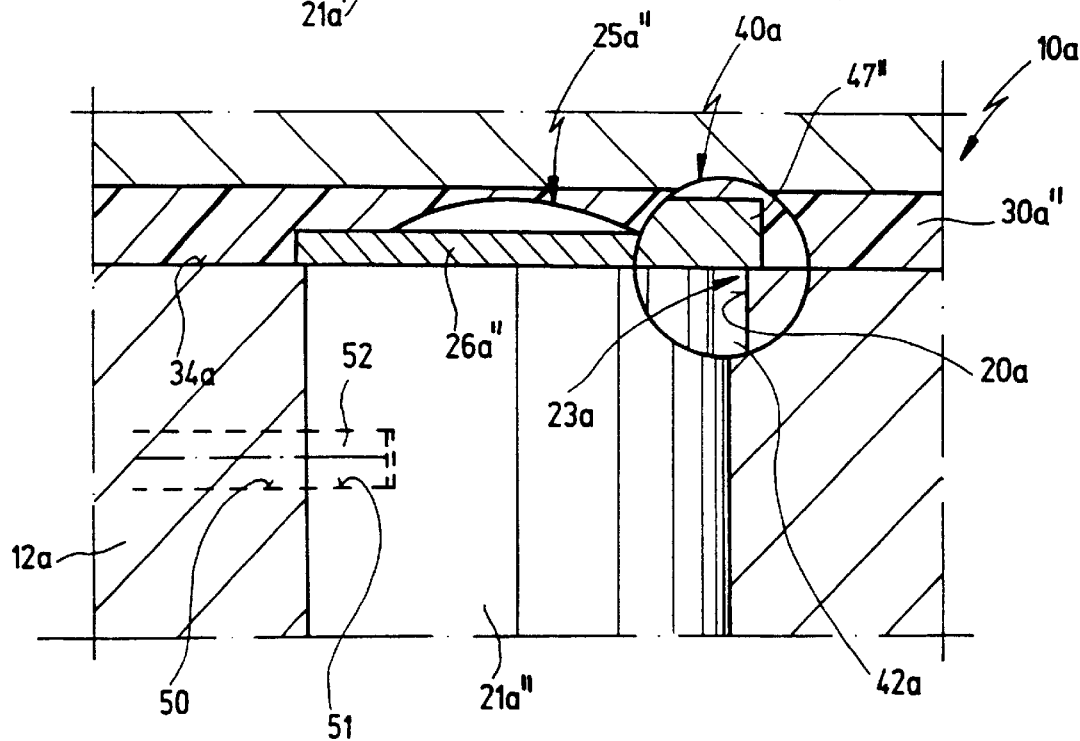

METHOD FOR INJECTION MOLDING A PLASTIC MATERIAL COMPOSITE DEVICE

FIELD OF THE INVENTION

This invention relates to the field of injection molding plastic material devices. More specifically, this invention is directed to a method and an apparatus for injection molding a composite device comprised of a plastic material having a component being at least partially embedded therein.

BACKGROUND OF THE INVENTION

During the injection molding of the plastic material devices one may, concurrently, provide components to be simultaneously injection molded, for example metallic components to enhance the mechanical stability, hooks, hinges and the like. Further, it is well-known in the art to injection mold so-called smart cards, i.e. plastic material cards having a module embedded therein. The module is inserted into the cavity of an injection molding machine mold prior to injecting the molten plastic material into the cavity. The term "module" is to be understood to comprise e.g. a semiconductor chip having, for example, an electric contact surface area being accessible from the outside of the card and serving to establish a single transmission line between the semiconductor chip and a card reading apparatus.

German patent specification 41 15 208 discloses a mold for manufacturing smart cards. Smart cards are flat devices of e.g. 50 mm width and 80 mm length and having a thickness of only about 0.6–0.8 mm. If an appropriately dimensioned cavity is provided in a plastic material injection molding mold, problems may arise due to the very narrow cross section because there might be a problem for the liquified or molten plastic material to propagate through the cavity with its very narrow cross-sectional area. This holds true the more when the extremely flat hollow cavity is, further, partially occupied by the module, the thickness of which being only a little smaller compared to the height of the cavity. If, for example, the module has a thickness of 0.6 mm and the inner height of the hollow cavity is 0.8 mm, the remaining free space "behind" the module is just a very narrow air gap of 0.2 mm width which does not allow an effective flow of the liquid plastic material.

The method and the apparatus disclosed in German patent specification 41 15 208 utilizes another approach. This prior art mold uses two piston-like plungers which are reciprocally operated. The plungers run in bores ending in a surface of the cavity. In the initial position the front faces of the plungers are essentially flush with that cavity surface. Therefore, in this initial position the molten plastic material may freely be injected into the practically unobstructed cross section of the hollow cavity. As long as the plastic material is still deformable, one of the plungers is advanced into the plastic material whereas the other stamp is retracted. The displacements and cross sections of the plungers are dimensioned such that during the movement of the plungers no change in volume occurs. Accordingly, when the plastic material has solidified and the device is ejected, it has a depression on that side where the first plunger had been advanced. This depression may be used for inserting a module in a subsequent operation, for example by gluing the module in place, after the plastic material device had been ejected from the mold.

It is, however, an inherent disadvantage of this prior art method that for mounting a module in the plastic material device a separate operational step is required after the unmolding of the device.

German disclosure document 41 42 410 discloses a method for producing flat plastic material devices, for example identification cards. This prior art device comprises two mold sections. The lower mold section has a prismatic, i.e. trapezoidal cross section. The lateral inclined surfaces are provided with flat hollow cavities having the shape of the identification cards to be produced. A second mold portion may be placed on top of the first mold portion, thus entirely covering the prismatic section. Moreover, channels are provided for injecting molten plastic materials into the hollow cavities.

Within the first mold portion bores are provided ending under right angles in the flat hollow cavities. Piston-like plungers run in these bores for feeding a module in a lateral direction to the hollow cavity. This is made by first retracting the plunger into an initial position and then again advancing the plunger which subsequently runs against a carrier sheet for stamping a module from that carrier sheet. While this is done molten plastic material is injected into the hollow cavity to replete same. By further advancing the plunger with the stamped-out module on top, the latter may be pressed into the liquid plastic material which is not yet solidified.

It is a disadvantage of this prior art apparatus that in view of the tolerances required to let the plunger run within the bore a small gap must be provided between the plunger and the surrounding bore surface. However, considering that the molten plastic material is injected under extremely high pressure, molten plastic material will also penetrate into the gap, the more as the pressure within the hollow cavity is still increased when the module is pressed into the liquid material which is not yet solidified. Therefore, when the plastic material is solidified and the plunger is retracted, the corresponding surface of the identification card has a small bulge around the module. The bulge is configured by the plastic material which has penetrated into the gap between the plunger and the bore. The bulge may be seen and felt by the user so that the identification card is defective insofar.

The prior art apparatus has the further disadvantage that due to the high pressure that prevails within the hollow cavity during the injection of the molten plastic material the plunger with the module resting on its front face may even be pressed back into the bore. As a result, the module will protrude from the corresponding surface of the identification card when the card has been produced.

Another similar process and apparatus are disclosed in German disclosure document 41 42 392.

It is, therefore, an object underlying the invention to provide a process and an apparatus of the kind mentioned at the outset which obviates the above-discussed disadvantages. In particular, it shall be possible to produce an entirely smooth, high-quality surface of the composite device, in particular a smart card.

SUMMARY OF THE INVENTION

The afore-mentioned and other objects are achieved by a method of injection molding a composite device comprised of a plastic material having a component being at least partially embedded therein, the method comprising the steps of:

providing a mold with a cavity therein, the cavity having a surface, an access bore to the cavity ending in the surface via an opening;

feeding the component through the access bore and via the opening to the cavity, wherein the component is configured to positively cover the opening upon transition thereof while coming to rest on the surface;

injecting molten plastic material into the cavity to enclose the component, thus forming the composite device;

ejecting the composite device from the cavity.

The objects are further achieved by a method of injection molding a composite device comprised of a plastic material having a component being at least partially embedded therein, the method comprising the steps of:

providing a mold with a cavity therein, the cavity having a surface, an access bore to the cavity ending in the surface via an opening;

feeding the component through the access bore to a first predetermined position within the access bore before the opening;

injecting molten plastic material into the cavity and into a portion of the access bore between the opening and the component at the first predetermined position;

displacing the component along the access bore from the first predetermined position via the opening to a second predetermined position within the cavity so as to transfer molten plastic material from the portion of the access bore into the cavity and concurrently pressing the component into the molten plastic material within the cavity;

ejecting the composite device from the cavity.

The objects are further achieved by an apparatus for injection molding a composite device comprised of a plastic material having a component being at least partially embedded therein, the apparatus comprising:

a mold with a cavity therein, the cavity having a surface, an access to the cavity ending in the surface via an opening;

means for feeding the component through the access and via the opening to the cavity, wherein the component is configured to positively cover the opening upon transition thereof while coming to rest on the surface;

means for injecting molten plastic material into the cavity to enclose the component, thus forming the composite device;

means for ejecting the composite device from the cavity.

The objects are further achieved by an apparatus for injection molding a composite device comprised of a plastic material having a component being at least partially embedded therein, the apparatus comprising:

a mold with a cavity therein, the cavity having a surface, an access bore to the cavity ending in the surface via an opening;

means for feeding the component through the access bore to a first predetermined position within the access bore before the opening;

means for injecting molten plastic material into the cavity and into a portion of the access bore between the opening and the component at the first predetermined position;

means for displacing the component along the access bore from the first predetermined position via the opening to a second predetermined position within the cavity so as to transfer molten plastic material from the portion of the access bore into the cavity and concurrently pressing the component into the molten plastic material within the cavity;

means for ejecting the composite device from the cavity.

The objects underlying the invention are thus entire achieved.

The fact that the transition between a gap at the transitional edge between the access bore and the surface is positively covered, i.e. covered with a certain overlap, it is entirely impossible for molten plastic material to penetrate into that area so that the formation of optically detectable bulges or the like in the surface of the produced device or smart card is entirely avoided. Moreover, by providing a certain lateral overlap between the component and the access bore opening, it is impossible to press the component back into the access bore. For this reason, too, an entirely smooth surface is generated on the device having an optimum optical quality.

Although the positive coverage of the transition may be effected in various ways, for example by laterally displacing the component, it is particularly preferred in an embodiment of the invention to first compress the component in a direction parallel to the surface and to then again release the component into a non-compressed state after having transitioned the opening.

This measure has the advantage that a simple change in the shape and dimension of the component, i.e. a relatively simple mechanical manipulation results in the required positive coverage of the transition.

This holds true in particular for a preferred modification of this embodiment where the component has an active element disposed on an elastic carrier, and wherein during the step of feeding the carrier is first compressed in a direction parallel to the surface and is again released into a non-compressed state after having transitioned the opening. For that purpose, the carrier may be made from an elastic material, may be provided with a lip seal at its periphery or may be shaped as a meander at its back face.

These measures have the advantage that due to the elasticity of the carrier the required positive coverage is effected automatically without necessitating further separate mechanisms.

In any event it is preferred when during the step of feeding the component is displaced along an inner surface of the access bore with the surface being configured to effect the compression and the release of the component. This holds true in particular when the access bore is at least partially configured conically with the transitional area taking the shape of a rectangle or a circle with an access bore portion being shaped as a pyramid or as a cone, respectively, at a distance from the opening or may entirely be configured as a cone.

These measures have the advantage that the change in shape of the carrier may simply be achieved by actually translating the carrier along the narrowing and then again widening inner surface of the access bore. If, for example, the inner surface of the access bore is entire or partially conically shaped, the carrier will impinge on that conical surface during its axial translation and will then be compressed more or less quickly in a direction parallel to the hollow cavity surface depending on the cone angle. As soon as the carrier then passes by the opening of the axis bore into the hollow cavity, i.e. passes the transition, the cross section of the axis bore suddenly widens into the hollow cavity. As a consequence, the carrier is again released automatically if it has the necessary elasticity. Depending on the particular field of application the amount of elastic release may be set such that the transition is positively covered with the required overlap.

In this connection it is particularly preferred in an embodiment of the inventive apparatus when the component is fed by means of a piston running in the access bore, the piston being preferably shaped at least partially in a complementary conical fashion.

This measure does not only have the above-discussed advantages that a deformable carrier may be compressed by simply running on a conical surface. Instead, this measure has the further advantage that the piston, when coming to rest in its terminal position constitutes a much better closure with respect to the hollow cavity surface as would e.g. be the case for a cylindrical piston or plunger in a correspondingly cylindrical access bore. In particular, when the conical piston comes to rest on the corresponding conical portion of the access bore, no annular gap is created as would be the case due to necessary tolerances in a cylindrical configuration. Instead, such peripheral gaps would only exist, when either the conical piston or the complementary conical bore would not be exactly conically shaped.

This embodiment of the invention has the further advantage that the piston coming to rest at its terminal position could b subjected to an appropriate closing force. The closing force could be set as high that even an extremely high injection pressure within the hollow cavity would not at the consequence to press the piston back into the access bore and, concurrently, also press back the component sitting on the piston front face. This particular feature is absent from systems utilizing a cylindrical piston or plunger in a likewise cylindrical bore because in the absence of a mechanical stop no such high closing pressure may be applied to the piston as discussed above.

When, in a more general aspect, components shall be fed to the cavity, one can provide one or more mechanical latches to mechanically latch the component at at least one predetermined position within the access bore. For that purpose, appropriate mechanical latch systems may be provided.

One can, for example, feed the component in a direction towards the hollow cavity until a first predetermined position where the component is still somewhat retracted from the hollow cavity surface. In that retracted position the component is no mechanical obstacle for the flow of molten plastic material injected into the hollow cavity. As soon as the cavity is entirely or almost entirely repleted with molten plastic material, the component may be advanced into a second predetermined position where its lower surface is flush with the corresponding surface of the hollow cavity and corresponding to the final position of the component within the cavity. By doing so the hollow cavity may be effectively repleted with molten plastic material without the problems associated with narrow cross sectional areas discussed above. Moreover, it would be possible to press the component into the still deformable plastic material and, concurrently, into its terminal position flush with the surface of e.g. the identification card.

If this option is used, the two predetermined positions may be mechanically defined by providing appropriate mechanical latches having the further advantage of withstanding even extremely high pressures within the hollow cavity during injection.

It goes without saying that these features may be used also in cases where the component which is fed to the cavity is not elastic and where the positive coverage or overlap features discussed above are not utilized.

It goes without saying that the afore-discussed features as well as the features which will be discussed below in connection with the description of the preferred embodiments may not be used only in the particularly given combination but also in other combinations or alone without leaving the scope of the present invention.

BRIEF DESCRIPTION OF THE DRAWINGS

Further advantages will become apparent from the description and the enclosed drawing.

Embodiments of the invention are shown in the enclosed drawing and will be described in more detail in the subsequent description of the preferred embodiments.

FIGS. 4 and 5 illustrate in a similar way as FIGS. 2 and 3 a first embodiment of the invention;

DETAILED DESCRIPTION OF THE PREFERRED EMBODIMENTS

Figure 1:
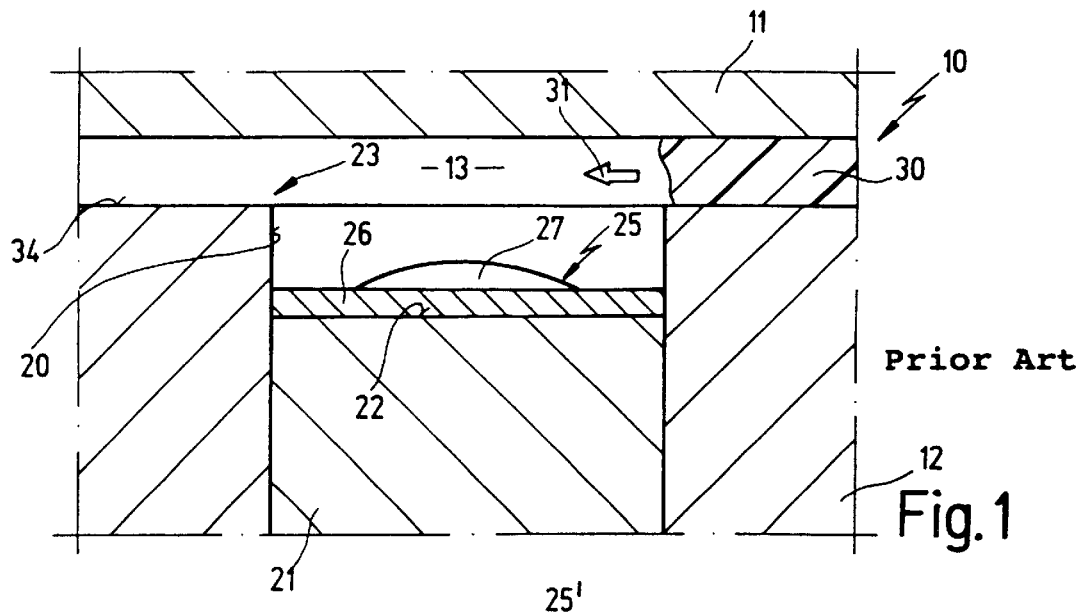
FIGS. 1–3 illustrate in a side elevational cross-sectional view a plastic material injection molding apparatus for producing smart cards to the prior art, in three distinct operational positions.

In the figures like elements are generally designated by like reference numerals. In the embodiments of FIGS. 4 and 5 "a" is added, in the embodiment of FIGS. 6–8 "b" is used as a suffix. Distinct operational positions are identified by adding one or two apostrophes.

In FIG. 1 reference numeral 10 as a whole indicates a plastic material injection molding tool or mold as used for the production of smart cards. Mold 11 comprises a first mold portion 11 as well as a second mold portion 12. A hollow cavity 13 is located between mold portions 11, 12. Hollow cavity 13 takes the shape of a smart card. Hollow cavity 13 may either be provided in first mold portion 11 or in second mold portion 12 or may partially be provided in both mold portions 11 and 12. The elements required for feeding liquified or molten plastic material to hollow cavity 13 as well as the elements required for heating mold 10 etc. are not illustrated for the sake of simplicity.

An access bore 20 is laterally directed towards hollow cavity 13. A plunger or piston 21 runs within bore 20 and has a front face 22 directed towards hollow cavity 13. Access bore 20 preferably has either a rectangular or a square cross section but may also be configured cylindrically or may have an arbitrary geometric cross section.

23 designates the transition between access bore 20 and hollow cavity 13. In other words, access bore 20 opens at 23 into a surface 34 of hollow cavity 13. Surface 34 corresponds to the later flat and smooth surface of the smart card to be produced.

A so-called module 25, or in a more general approach, a component is held ready on front face 22 of piston 21. Module 25 comprises a carrier 26 as well as an integrated semiconductor chip 27 arranged on top thereof. It goes without saying that module 25 may also be an arbitrary component, for example a hinge, a reinforcing element, a handle or the like. The component had been placed on front face 22 of piston 21 previously in a mounting position (not shown), for example by means of a conventional handling system when the piston 21 is retracted far back.

Reference numeral 30 in FIG. 1 indicates that a molten plastic material may be injected laterally into hollow cavity 13, as indicated by an arrow 31. In FIG. 1 the lead of molten plastic material 13 has not yet reached access bore 20. Piston 21 with module 25 is still in a retracted position.

Figure 2:
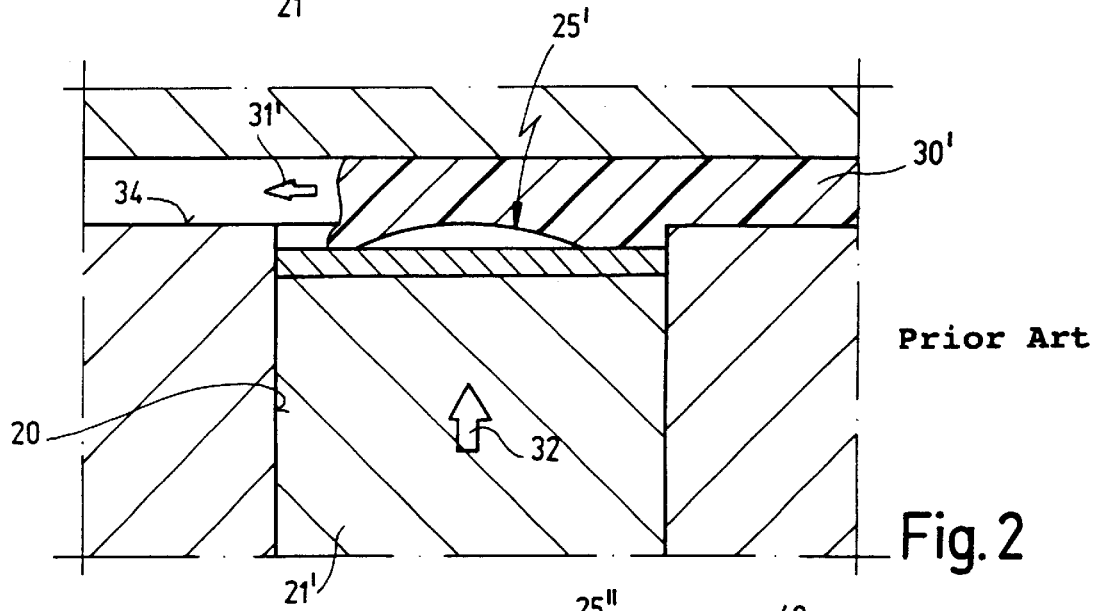

In a somewhat later operational position as shown in FIG. 2 piston 21' has been advanced upwardly as indicated by an arrow 32. Module 25 in this situation has almost reached surface 34. As indicated by an arrow 31', the lead of molten plastic material 30' has now essentially passed access bore 20.

Figure 3:
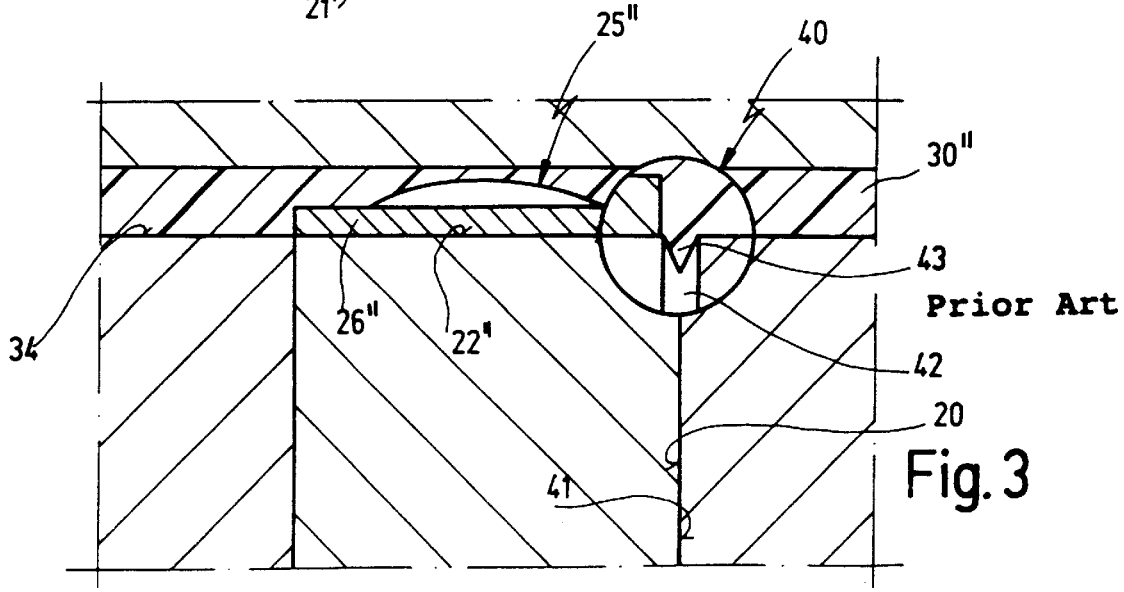

FIG. 3 shows the terminal operational position. Piston 21" is in its upper end position in which its front face 22' is flush with surface 34. Module 25" has been impressed into solidifying molten plastic material 30'". Carrier 26" is now in a position where its lower surface is also flush with surface 34.

However, as can be seen from a blown-up section 40 in FIG. 3, a gap 42 exists between a peripheral surface 41 of piston 21 and the inner surface of access bore 20 due to the necessary clearance between piston 21 and access bore 20 making movement of piston 21 and access bore 20 possible and, further, in view of the unavoidable tolerances. Molten plastic material 30" during injection under high pressure penetrates into gap 42 and forms a protrusion which takes the shape of a peripheral bulge 43 on the smart card after it has been unmolded. Peripheral bulge 43 is visible by the eye and palpable, thus constituting a significant quality defect.

In the embodiment of the invention shown in FIGS. 4 and 5 things are different insofar as in that case carrier 26a is configured elastically, i.e. may consist of an elastic material. Carrier 26a, however, may also be provided at its peripheral edge with some kind of lip seal. As an alternative, carrier 26a on its side facing away from hollow cavity 13 may be provided with a meander over a substantial portion of its thickness for effecting a compressibility in a radial direction. In the position shown in FIG. 4 and corresponding to the position in the prior art of FIG. 2 module 25a' is located shortly below surface 34 in a position identified on the left hand side of FIG. 4 by "A". Carrier 26a' in that position engages the wall of access bore 20 under laterally directed pressure, as symbolized by arrows 46. This means that at least a rim 47' of carrier 26a' is compressed in a direction parallel to surface 34.

The compression of rim 47 or of the entire carrier 26a, respectively, may, for example, be effected by providing a ramp 48 or a conical section as shown in FIG. 4 below access bore 20. Carrier 26a during the upwardly directed movement of piston 21a runs on ramp 48 in the direction of an arrow 32a and is, hence, compressed in the direction of arrows 46.

As soon as piston 21a has reached the position identified by "B" in FIG. 4 carrier 26a' passes the transition 23a between axis bore 20 and surface 34. As shown in FIG. 5, the laterally compressed carrier 26a" may, hence, release and widen outwardly, thus concurrently overlapping transition 23a in surface 34.

As can clearly be seen from the blown up section 40a in FIG. 5, rim 47" now overlaps transition 23a, so that gap 42a is positively covered with respect to plastic material 30". Therefore, no plastic material 30a" may penetrate into gap 42a. The lower surface of module 25a" or carrier 26a", respectively, hence lie flush with surface 34a and an entirely smooth surface of the smart card is generated.

On the left hand side of FIG. 5 it is further shown that piston 21" in its illustrated terminal end position may be mechanically latched. For that purpose piston 21" as well as the corresponding mold portion 12a are provided with bores 50, 51 which are flush to each other in the position of FIG. 5. By means of a pin 52 inserted into both bores 50 and 51 piston 21a" may thus be latched in an axial direction. As a consequence, even if an extremely high pressure prevails in hollow cavity 13a, piston 21a may not be displaced backwardly, i.e. downwardly.

The method illustrated in FIGS. 4 and 5 may be still more refined if piston 21a' when it is in the position indicated by "A" is briefly stopped as long as the liquid molten plastic material 30a' flows into hollow cavity 13a. The position A shown must, however, be understood only as an example. Of course, piston 21a' may be advanced a little bit more so that the upper surface of carrier 26a' is flush with surface 34a'. In any event position A is selected such that molten plastic material 30a' may freely flow into hollow cavity 13a without being obstructed by an obstacle.

In second step piston 21a' is now advanced into its terminal position B and, hence, module 25a' is pressed into molten plastic material 30a', as indicated in FIG. 5 by 25" and 30a'.

By impressing module 25a" according to FIG. 5, one can, further, apply the necessary pressure which would otherwise be required for compensating for the shrinkage occurring in the plastic material during solidifying.

Figure 6:
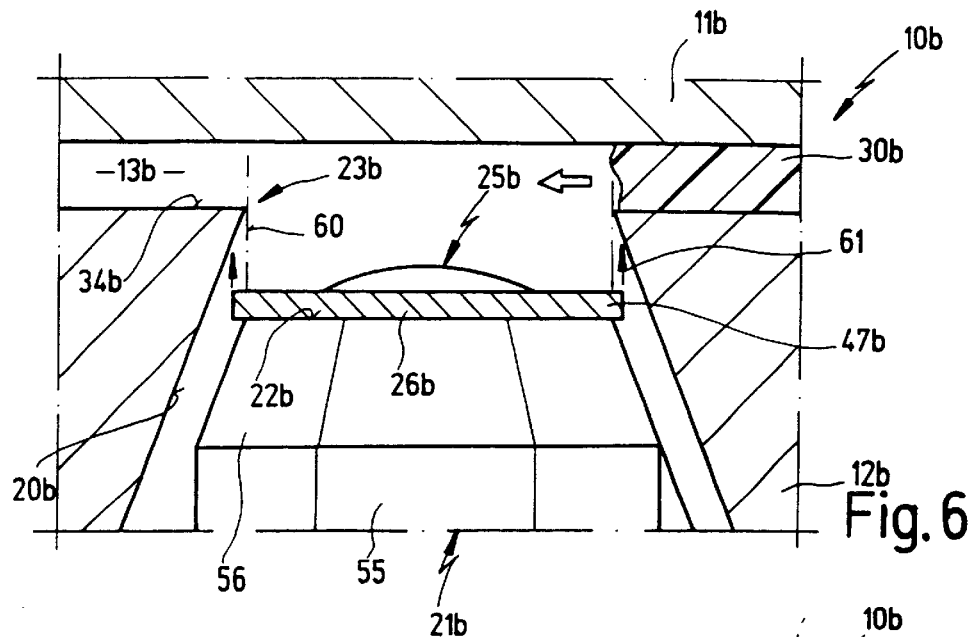
FIGS. 6–8 illustrate a second embodiment of the invention in a way similar to that of FIGS. 1–3.
Figure 7:
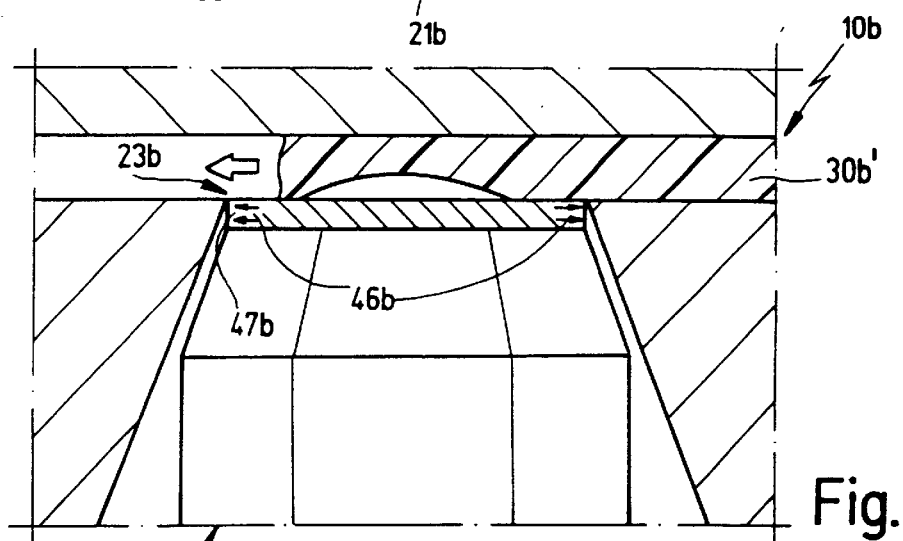
Figure 8:
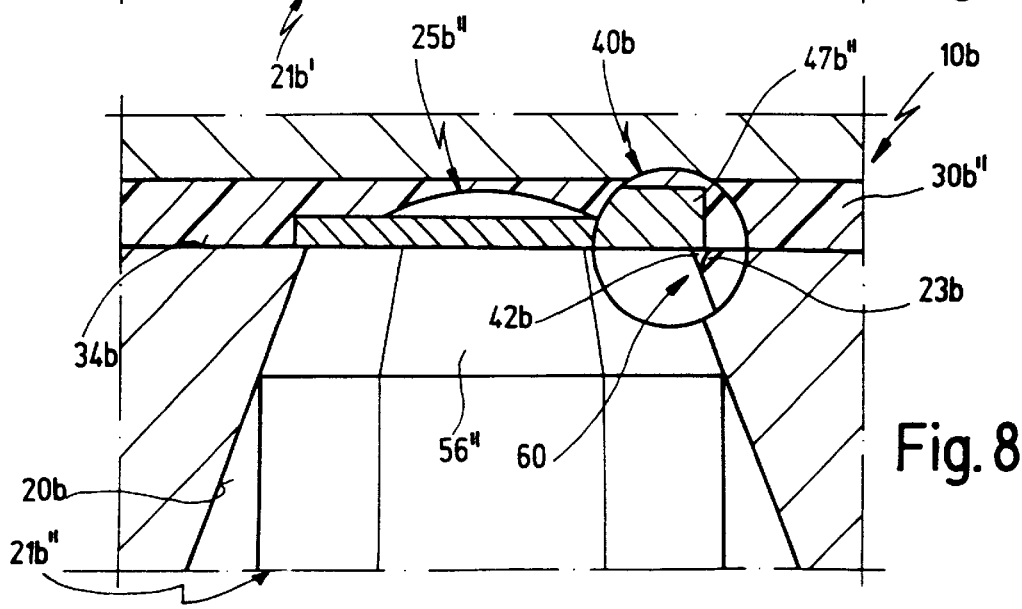

In the further embodiment of the invention shown in FIGS. 6–8 there is a modification insofar as access bore 20b within mold portion 12b is now made entirely conical, i.e. becomes narrower in an upward direction and may, for example, take the shape of a pyramid or a cone. As a consequence, piston 21b in a lower section in FIG. 6 is configured cylindrically, whereas a front section 56 is configured conically. The conical shape of section 56 is complementary to the conical shape of access bore 20b.

Carrier 26b again, is made from an elastic material. Its rim 47b slightly protrudes over front face 22b of piston 21b.

As one can easily see from FIG. 6, carrier 26b has a somewhat larger cross section as compared to an opening 60 in access 20b within surface 34b. As indicated by arrows 61, carrier 26b comes into contact with conical access bore 20b prior to reaching transition 23b. As soon as elastic carrier 26b impinges on conical access bore 20b along arrows 61, the backward space of access bore 20b is tightly sealed towards hollow cavity 13b. This corresponds to the above-discussed first position A of FIGS. 4 and 5 in which piston 21b may be briefly stopped. The molten plastic material 30b may now be injected into hollow cavity 13b. When flowing into hollow cavity 13b it is obstructed by module 25b because module 25b is positioned at least partially below surface 34b. On the other hand side a penetration of molten plastic material 30b into the back section of access bore 20b is prevented because, as mentioned above, access bore 20b is sealed towards hollow cavity 13b.

As soon as hollow cavity 13b is now partially or entirely repleted with molten plastic material 30b, piston 21b', may now be displaced upwardly as shown in FIG. 7 where the condition of maximum compression (arrows 46b) is attained because rim 47b is now compressed to the narrowmost cross section in the area of transition 23b.

As soon as hollow cavity 13b is now entirely repleted with molten plastic material, as shown by reference numeral 30b" in FIG. 8, piston 21b" is displaced into its terminal position of FIG. 8. Rim 47b" now jumps over transition 23b or opening 60, respectively, and positively covers or overlaps gap 42b. Gap 42b to a certain extent is unavoidable for reasons of practical design, for example because in the area of transition 23b between conical axis bore 20b and flat surface 34b a certain rounding is necessary.

From FIG. 8 one may, further, take that conical section 56" snugly fits into conical access bore 20b. Therefore, it is possible to exert an axial closure force from below on piston 21b" in its position of FIG. 8. Such axial closure force prevents that piston 21b" is pressed back and downwardly by the inherent pressure within liquid plastic material 30b".

What is claimed is:

1. A method of injection molding a composite device comprised of a plastic material having a component being at least partially embedded therein, the method comprising the steps of:

providing a mold with a cavity therein, said cavity having a surface, an access bore to said cavity ending in said surface via an opening;

feeding said component through said access bore and via said opening to said cavity, wherein said component is configured to cover said opening upon transition thereof with an overlap while coming to rest on said surface;

injecting molten plastic material into said cavity to enclose said component, thus forming said composite device; and ejecting said composite device from said cavity.

2. The method of claim 1, wherein during said step of feeding said component is first compressed in a direction parallel to said surface, and is again released into a non-compressed state after having transitioned said opening.

3. The method of claim 2, wherein said component has an active element disposed on an elastic carrier, and wherein during said step of feeding said carrier is first compressed in a direction parallel to said surface, and is again released into a non-compressed state after having transitioned said opening.

4. The method of claim 2, wherein during said step of feeding said component is displaced along an inner surface of said access bore, said inner surface being configured to effect said compression of said component.

5. The method of claim 1, wherein during said step of feeding said component is mechanically latched at a predetermined position along said access bore.

6. The method of claim 1, wherein during said step of feeding said component is mechanically latched at a first and at a subsequent second predetermined position along said access bore.

7. A method of injection molding a composite device comprised of a plastic material having a component being at least partially embedded therein, the method comprising the steps of:

providing a mold with a cavity therein, said cavity having a surface, an access bore to said cavity ending in said surface via an opening;

feeding said component through said access bore to a first predetermined position within said access bore before said opening;

injecting molten plastic material into said cavity and into a portion of said access bore between said opening and said component at said first predetermined position;

displacing said component along said access bore from said first predetermined position via said opening to a second predetermined position within said cavity so as to transfer molten plastic material from said portion of said access bore into said cavity and concurrently pressing said component into said molten plastic material within said cavity, wherein said component is first compressed in a direction parallel to said surface, and is again released into a non-compressed state after having transitioned said opening so as to cover said opening upon transition thereof with an overlap while coming to rest on said surface; and ejecting said composite device from said cavity.

8. The method of claim 7, wherein during said step of displacing said component is configured to positively cover said opening upon transition thereof while coming to rest on said surface.

9. The method of claim 8, wherein during said step of feeding said component is first compressed in a direction parallel to said surface, and is again released into a non-compressed state after having transitioned said opening.

* * * * *